United States Patent
Hedrick

[15] 3,679,954
[45] July 25, 1972

[54] BRUSHLESS D.C. MOTOR WITH RATE CONTROL OF POSITION SENSOR

[72] Inventor: Geoffrey S. Hedrick, Katonah, N.Y.
[73] Assignee: Lear Siegler, Inc., Armonk, N.Y.
[22] Filed: July 13, 1970
[21] Appl. No.: 54,387

[52] U.S. Cl. ................................. 318/254, 318/327
[51] Int. Cl. ........................................... H02k 29/00
[58] Field of Search ............ 318/254, 138, 696, 685, 615, 318/616, 617, 618, 326, 327

[56] References Cited

UNITED STATES PATENTS

| | | |
|---|---|---|
| 3,440,506 | 4/1969 | Krestel et al. ............ 318/327 X |
| 3,264,539 | 8/1966 | Sander .................... 318/227 X |
| 3,304,481 | 2/1967 | Saussele .................. 318/226 X |
| 3,329,852 | 7/1967 | Saussele et al. ........... 318/226 X |
| 3,377,535 | 4/1968 | Yasuoka et al. ............ 318/227 X |

Primary Examiner—G. E. Simmons
Attorney—Wilfred O. Schmidt and Hubell, Cohen & Stiefel

[57] ABSTRACT

A direct rate feedback signal is provided for a magnetic flux sensor, such as a magneto-sensitive Hall effect sensor or a Magnistor, of a brushless D. C. motor by providing an independent feedback path for the sensor which path contains a stator winding which is independent from the motor excitation stator windings and which is positioned in magnetic coupled relation with the motor rotor. A differential amplifier is also provided which is associated with the Hall sensor for obtaining a differential Hall sensor voltage during rotation of the rotor which voltage is fed to the excitation windings in a separate path. Constant speed control for a brushless D. C. motor having a pair of angularly displaced magnetic flux sensors is provided by providing, in an independent feedback path for one sensor, a means having a center frequency, which means is responsive to a frequency deviation of a frequency associated with the angular velocity of the rotor from the center frequency, for providing a negative feedback signal, and a means for functionally operating on the feedback signal to produce a speed regulation signal which is supplied to both sensors.

28 Claims, 6 Drawing Figures

INVENTOR
GEOFFREY S. HEDRICK
BY
ATTORNEYS.

INVENTOR
GEOFFREY S. HEDRICK
BY
ATTORNEYS.

INVENTOR
GEOFFREY S. HEDRICK
ATTORNEYS.

3,679,954

BRUSHLESS D.C. MOTOR WITH RATE CONTROL OF POSITION SENSOR

BACKGROUND OF THE INVENTION

1. Field of the Invention

The present invention relates to brushless D. C. motors having direct rate feedback control and/or frequency sensitive constant speed regulation.

2. Description of the Prior Art

Brushless D. C. motors having a stator, and a magnet as a rotor, and which utilize magneto-sensitive Hall effect sensors that produce a differential output voltage across the sensor output terminals that is proportional to the applied D. C. voltage across the sensor times the magnetic flux density at the sensor, are well known. These motors make use of the principle that the output voltage of each of the sensors will be proportional to the difference between the angular location of the sensor itself and the angular position of the rotor magnetic vector. In these well known motors, when the magnet rotor is rotated, the differential output voltage of the two Hall Effect sensors is proportional to the sine and cosine of the angular position of the rotor. When these two output voltages are applied to the two stator excitation windings of the motor, which windings are normally perpendicular to each other, a magnetic vector is induced in the stator which leads the magnetic vector of the rotor by an angle equal to the angular difference between the location of the sensor winding and the location of the excitation winding. The magnitude of this induced magnetic vector is proportional to the voltage applied to the two magnetic sensors themselves. When a voltage is applied to these two sensors, the leading magnetic vector induced in the stator provides a shaft torque which is directly proportional to the voltage applied to the magneto-sensitive sensors. Since the magnitude of this stator vector is directly proportional to the applied voltage and independent of the shaft position, a constant shaft torque is applied, which torque is independent of the rotor position. Thus, brushless D. C. motors are advantageous beyond the obvious wear free operation, in that they totally eliminate the generated EMI (electromagnetic interference) found in all commutating devices.

However, these conventional motors do not have any provision for directly relating the shaft velocity to the voltage applied to the Hall sensors so as to insure smooth dynamic operation and provide true torque independence. Prior art attempts to overcome this intrinsic instability in the motor have involved the use of elaborate lead-lag networks. In addition, although there have been some prior art attempts at providing reversible brushless D. C. motors, these motors have not proved satisfactory due to the instabilities associated with dynamic operation.

Prior art attempts to provide constant speed motors, not of the brushless D. C. type, have involved the use of frequency sensitive circuits in a motor speed control feedback path to provide a constant speed for the motor. However, such prior art motors are subject to load and feedback voltage variations which introduce errors in the constant speed of the motor. These errors result in some deviation in the speed of the motor. These deviations can result in appreciable errors, when the motor is utilized for a purpose which requires a constant speed for the motor, such as when it is utilized as a servo-mechanism for driving a gyro.

SUMMARY OF THE INVENTION

An improved brushless D. C. motor is constructed which includes a first excitation stator, a magnetic rotor rotatably positioned in magnetic relation with the first stator, a magnetic flux sensor means positioned in fixed relation to the first stator and in magnetic relation to the rotor so as to sense the magnitude of the rotor flux density as a sinusoidal function of angular position of the rotor and produce a signal proportional thereto, a second stator magnetically independent from the first stator and positioned in magnetic relation with the rotor, and an independent feedback path for the sensor means, the independent feedback path including the second stator whereby direct rate feedback control for the sensor means is provided. The rotor has an angular velocity associated therewith which angular velocity has a frequency corresponding thereto. The proportional signal is at the corresponding frequency. The independent feedback path may also include means responsive to the rotor angular velocity corresponding frequency. This frequency responsive means has a center frequency associated therewith, and produces a feedback signal proportional to a deviation of the corresponding frequency from the center frequency. Furthermore, the independent feedback path may also include a means responsive to the feedback signal for functionally operating on the feedback signal to produce a speed regulation signal which is supplied to the sensor means, which in turn supplies a feedback signal to the first stator.

DETAILED DESCRIPTION OF THE PREFERRED EMBODIMENTS

Figure 1:
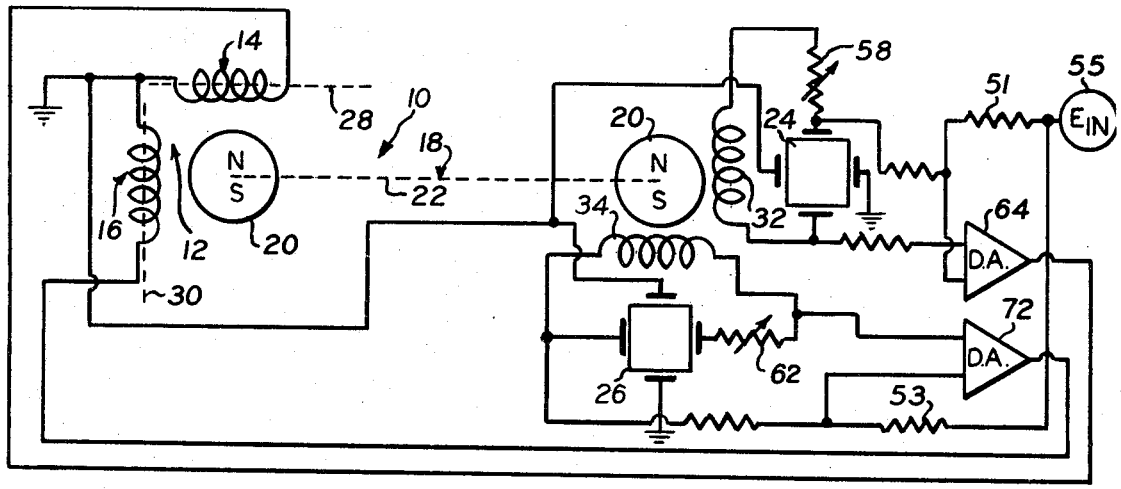
FIG. 1 is a diagrammatic view, partially schematic, of the preferred embodiment of the present invention.
Figure 2:
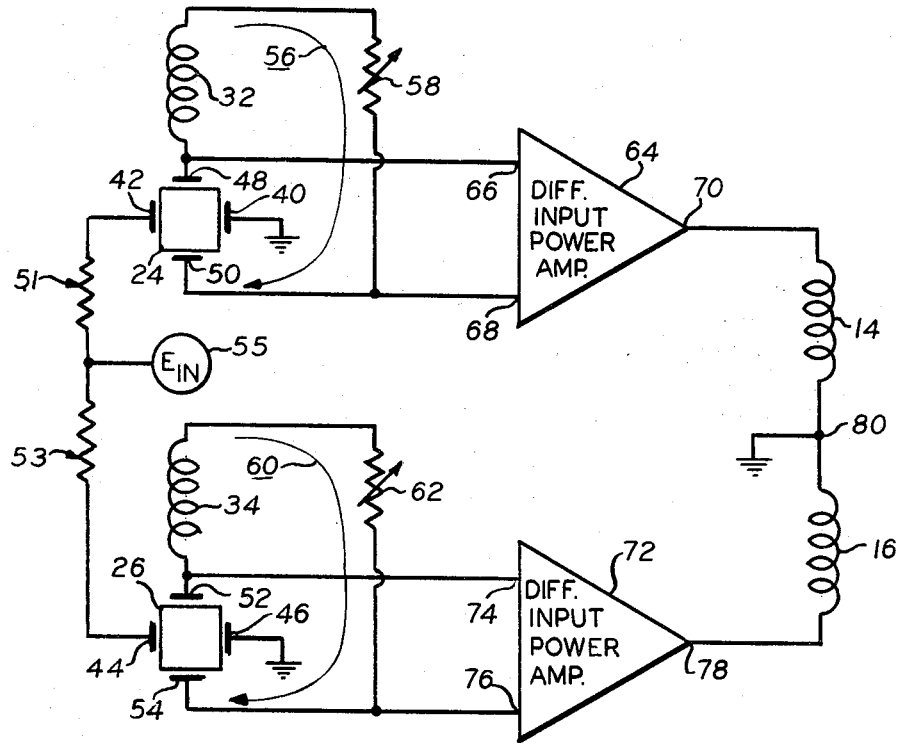
FIG. 2 is a schematic diagram of the embodiment shown in FIG. 1.

Referring now in detail to the drawings, and especially to FIGS. 1 and 2 which show the presently preferred embodiment of the present invention, a brushless D. C. motor, generally referred to by the reference numeral 10. The brushless D. C. motor 10, which may be a conventional brushless D. C. motor such as the type readily available from Siemans Corporation of America, preferably includes an excitation stator, generally referred to by the reference numeral 12, preferably having two perpendicular excitation windings 14 and 16, respectively, which are commonly termed the cosine and sine windings, respectively. These excitation windings 14 and 16, preferably, each having an equal number of turns of wire and are of substantially equal resistance for a purpose to be described in greater detail hereinafter. The motor 10 also, preferably, includes a magnetic rotor, generally referred to by the reference numeral 18, rotatably positioned in magnetic relation with the stator excitation windings 14 and 16. As shown and preferred, the rotor 18 includes a permanent magnetic 20 which is supported by a shaft 22 for rotation.

As shown and preferred, two magneto-sensitive conventional Hall effect sensors 24 and 26, are angularly displaced apart from each other, preferably at an angle of 90°. If desired Hall sensors 24 and 26 could be replaced by any other magnetic flux sensor which provides a signal proportional to magnetic flux, such as magnetically sensitive transistors which are commercially available under the name Magnistor. Furthermore, as shown and preferred, the sensors 24 and 26 are also angularly displaced 90° with respect to the magnetic axes 28 and 30 of the excitation windings 14 and 16, respectively. Hall sensor 24 is angularly displaced 90° with respect to magnetic axis 28, and Hall sensor 26 is angularly displaced 90° with respect to magnetic axis 30. If desired, the angular displacement of the Hall sensors 24 and 26 with respect to the respective magnetic axes 28 and 30 of the excitation windings 14 and 16 could be any desired angle other than 90° such as 45°.

Referring now to FIG. 2, the improvement of the present invention includes additional stator windings 32 and 34 which are, preferably, magnetically independent of stator excitation windings 14 and 16, for a purpose to be described in greater detail hereinafter. Stator windings 32 and 34 are wound on a second stator stack to prevent direct coupling to the excitation windings 14 and 16. These independent stator windings 32 and 34 are, preferably, perpendicular to each other. Stator winding 32 is, preferably, aligned with the magnetic axis 36 of Hall sensor 24, and independent stator winding 34 is, preferably, aligned with the magnetic axis 38 of Hall sensor 26. Each Hall sensor 24 and 26 includes a pair of input terminals 40 and 42, and 44 and 46, respectively, which are each displaced 180° apart from each other, and a pair of output terminals 48 and 50, and 52 and 54, respectively, which are also each displaced 180° apart from each other. Each of the terminals 40, 42, 44, 46, 48, 50, 52 and 54 is associated with an electrode of the respective Hall sensors 24 and 26 to either apply an electrical potential thereto or to pick up an electrical potential therefrom.

Terminals 42 and 44 of Hall sensors 24 and 26, respectively, are connected through resistors 51 and 53, respectively which are connected in common, to a source 55 of applied voltage to provide a current source for sensors 24 and 26. Preferably, the value of resistors 51 and 53 are equal and substantially greater than the internal impedance of the respective Hall sensors 24 and 26 so as to provide a constant current source therefor. Independent stator winding 32 is connected in an independent feedback path 56 between output terminal 48 and output terminal 50 of the hall sensor 24 to provide a direct rate feedback signal thereto in a manner to be described in greater detail hereinafter. The feedback path 56 preferably includes a scaling resistor 58 connected between the independent stator winding 32 and the output terminal 50 of the Hall sensor 24. The value of the scaling resistor 58 is chosen to be equivalent to the proportionality constant between the angular velocity of the rotor shaft 22 and the induced signal applied to the Hall sensor 24 through winding 32, so as to, preferably, provide a linear torque-speed relationship. The scaling resistor 58 provides a linear slope for the torque-speed curve of the motor which may be changed by merely changing the value of resistor 58. If a non-linear torque-speed relationship is desired, the scaling resistor 58 may be replaced by a non-linear impedance such as a capacitor (not shown). Furthermore, resistor 58 in addition to the previously described scaling function also performs the function of providing a feedback signal which is substantially independent of variations in the internal impedance of the Hall sensor 24. If these functions are not desired, this scaling resistor 58 may be omitted, as illustrated in the embodiment shown in FIG. 3.

A similar arrangement is, preferably, provided for Hall sensor 26 wherein an independent feedback path 60 between output terminal 52 and input terminal 46 is provided. This feedback path 60 includes the winding 34 and another scaling resistor 62 whose functions are similar to those of scaling resistor 58 described above and which also may be omitted, as illustrated in the embodiment shown in FIG. 3, if these functions are not desired. Furthermore, if a non-linear torque-speed relationship is desired, resistor 62 could be replaced by a non-linear impedance, such as a capacitor (not shown).

Output terminal 48 and output terminal 50 of Hall sensor 24 are, preferably, connected to a differential input power amplifier 64, which is conventional and need not be described in greater detail hereinafter. Suffice it to say, the differential input power amplifier 64 includes two input terminals 66 and 68, output terminal 48 being connected to input terminal 66, and output terminal 50 being connected to input terminal 68, and an output terminal 70 which output terminal 70 is connected to stator excitation winding 14 to provide a signal path thereto in a manner to be described in greater detail hereinafter.

Similarly, for Hall sensor 26, another conventional differential input power amplifier 72 having input terminals 74 and 76 connected to output terminal 52 and output terminal 54, respectively, of Hall sensor 26, has an output terminal 78 which is connected to excitation winding 16 to provide a signal path thereto in a manner to be described in greater detail hereinafter. Excitation windings 14 and 16, preferably, have their opposite ends connected together at a point 80 which is in turn connected to ground.

OPERATION

The operation of the brushless D. C. motor 10 of the present invention is as follows: When a D. C. voltage is applied, to each of the excitation windings 14 and 16, respectively a constant magnetic vector is generated whose direction is defined by the arc tangent of the sine winding 16 voltage divided by the cosine winding 14 voltage. The magnitude of this magnetic vector is proportional to the square root of the sum of the squares of the individual voltages. A valid magnetic vector relationship is provided due to the fact that the excitation windings 14 and 16 have an equal number of turns and substantially equal resistances. When the magnetic vector is produced by energizing the stator excitation windings 14 and 16, the rotor 18 rotates so as to align itself with this magnetic vector. This produces an alignment torque on the rotor shaft 22. The alignment torque produced on the shaft 22 is proportional to the magnitude of the excitation voltage times the sine of the angular difference between the position of the magnetic pole, or rotor 22 and the magnetic vector prior to this alignment. The Hall sensors 24 and 26 each produce a differential output voltage across two of their respective terminals, 50 and 48 for sensor 24, and 54 and 52 for sensor 26, which is proportional to the applied D. C. excitation across the respective sensor 24 and 26 times the magnetic flux density at the sensor 24 and 26. The output voltage of each of the sensors 24 and 26 is proportional to the difference between the angular location of the sensor 24 and 26 itself and the angular position of the magnetic vector of rotor 18. If this magnetic vector has a direction defined by the angle $\theta$ where the sine winding 16 excitation voltage is defined as $E \sin\theta$ and the cosine excitation winding 14 voltage is defined as $E \cos\theta$, and a magnitude defined by the expression $\mu NI$, where $\mu$ is the permeability constant, and N is the number of turns of wire in the respective coils and I is the current flowing in the coils, a magnetic vector of this magnitude ($\mu NI$) and an angle $\theta$ which is equal to arc tangent sin $\theta / \cos\theta$ is produced. As the permanent magnet rotor 18 is rotated, the differential output voltage of the two sensors 24 and 26 will be proportional to the sine and cosine, respectively, of the angular position of rotor 18. The voltage produced by Hall sensor 24 is proportional to $\cos(\theta + \beta)$ and the voltage produced by Hall sensor 26 is proportional to $\sin(\theta + \beta)$, where $\theta$ represents the angle of the rotor shaft 22 and $\beta$ represents the angular difference between the axis of the excitation winding and its associated Hall sensors 24 and 26, the angle $\beta$ being equal to 90° in the preferred embodiment.

The differential output of the Hall sensors 24 and 26 is a constant. This differential output is taken from terminals 50 and 48 for sensor 24 and terminals 54 and 52 for sensor 26, and is applied to differential power amplifiers 64 and 72, respectively. These amplified output voltages are then applied to the excitation stator windings 14 and 16, respectively, which are electrically connected together at point 80. This applied signal voltage produces a magnetic vector which leads the rotor 18 magnetic vector by an angle equal to the angular difference between the location of the sensors 24 and 26 and the location of their respective excitation windings 14 and 16. This stator produced vector produces an aligning vector of constant magnitude, proportional to the magnitude of the stator produced vector, which thereby results in a constant torque on the rotor shaft 22. The magnitude of this induced magnetic vector is proportional to the signal applied to the two Hall sensors 24 and 26. When a signal is applied to the sensors 24 and 26, the leading magnetic vector which is produced by the stator windings 14 and 16 induces a shaft torque which is directly proportional to the signal applied to the sensors 24 and 26. Since the output signals of the Hall effect sensors 24 and 26 are proportional to the magnetic flux density times the applied current through the sensors 24 and 26, the shaft torque is proportional to the signal applied to the sensors 24 and 26. By merely changing the polarity of the signal applied to the sensors 24 and 26, the direction of the magnetic stator vector produced would be reversed in direction and, therefore, the direction of the shaft torque would be reversed, thereby enabling a reversal in direction of rotation for the brushless D. C. motor.

As the rotor 18 rotates, a voltage is induced in the independent stator windings 32 and 34 which is proportional to the rotor 18 angular velocity and is defined by the equation $V = N (d\phi/dt)$, where $N$ equals the number of turns of wire and $\phi$ equals the magnetic flux. As the rotor 18 turns, the flux through the independent windings 32 and 34 is defined by $\phi_{max}\cos\alpha\pi\frac{1}{8}$, where $\alpha$ equals the angle between the rotor 18 magnetic vector and the respective winding 32 or 34 magnetic axis. Since the windings 32 and 34 are aligned with the sensors 24 and 26, respectively, the induced voltage produced therefrom is always in phase with the output voltage of the sensors 24 and 26 when a constant polarity voltage is applied to the sensors 24 and 26. The outputs of the windings 32 and 34 are applied across the two Hall effect sensors 24 and 26, respectively, through scaling resistors 58 and 62, respectively. This provides a direct rate feedback signal which directly relates the rotor shaft 22 velocity to the signal applied to the Hall sensors 24 and 26, and this signal is directly proportional to the input error signal. This feedback signal ensures smooth, dynamic operation under varying load conditions, as the production of the signal is substantially independent of load.

Figure 3:
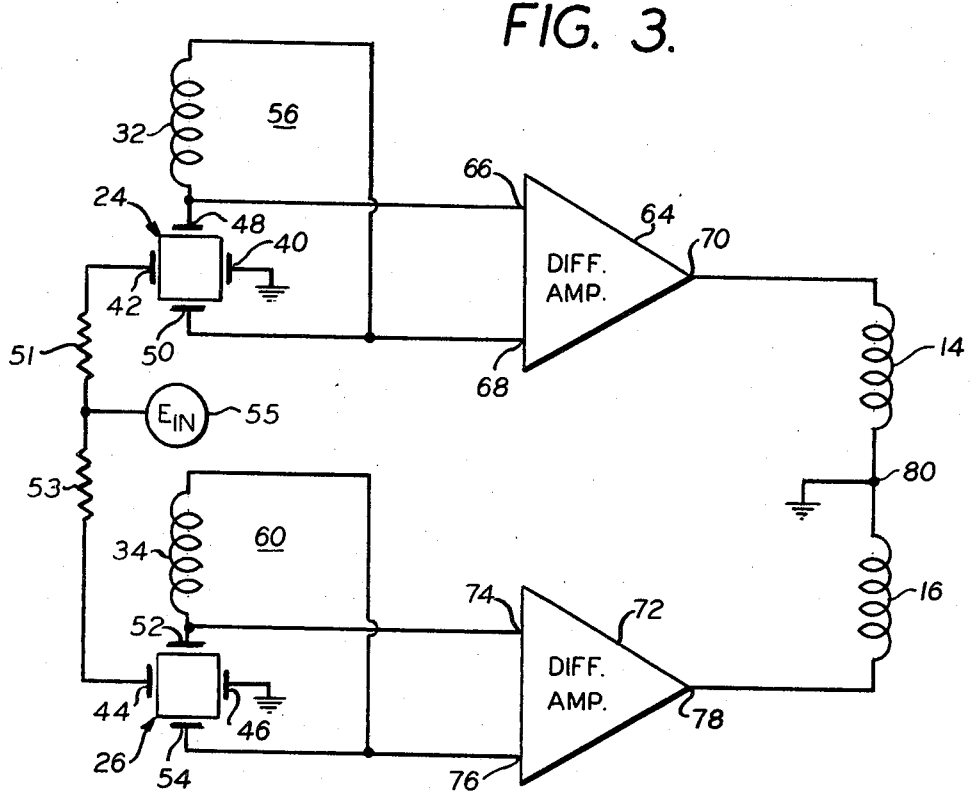
FIG. 3, 4 and 5 are schematic diagrams of alternative embodiments of the invention shown in FIG. 1.

A direct rate feedback signal which is responsive to internal impedance variations of the Hall sensors 24 and 26 is provided in essentially the same manner in the embodiment shown in FIG. 3, and need not be discussed in greater detail.

Figure 4:
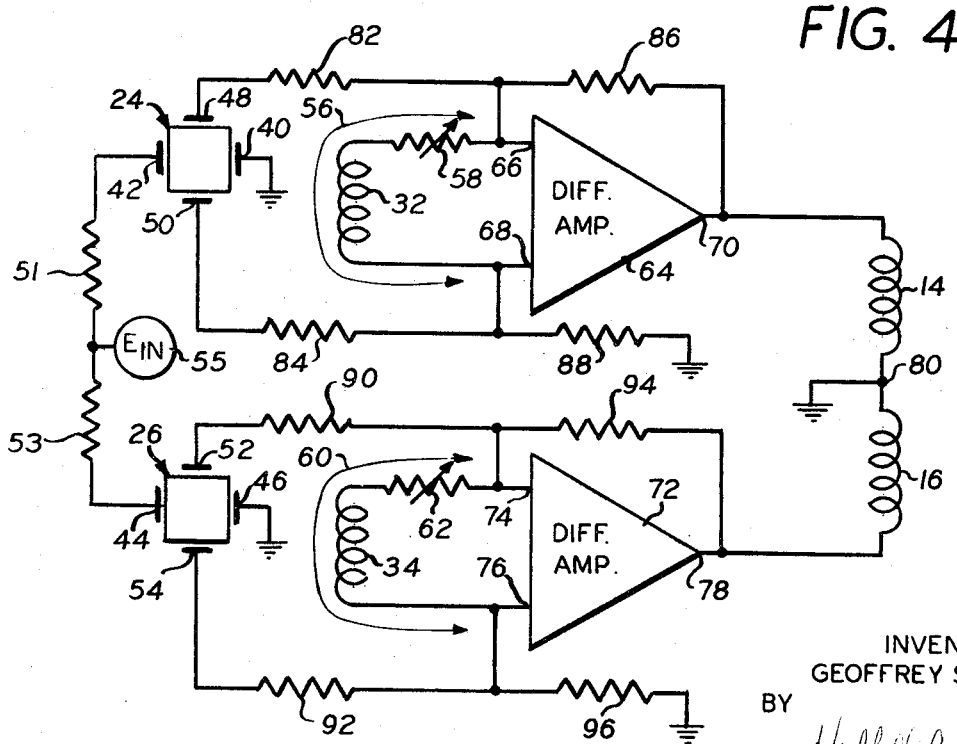

Referring now to FIGS. 2 and 4, the feedback paths 56 and 60, in effect, provide summing junctions in which the feedback voltage to the Hall sensors 24 and 26 is dependent on the internal impedance of the Hall sensors 24 and 26. This feedback voltage may vary in accordance with variations in this impedance, which in some instances may be as much as 100 percent, unless means are provided to minimize the effects of these variations. The embodiment of FIG. 4 illustrates a means of minimizing these effects so as to provide a feedback voltage which is independent of variations in the internal impedance of the respective Hall sensors 24 and 26.

In the embodiment shown in FIG. 4, the same reference numerals being utilized for components identical with those shown in FIG. 2, independent feedback path 6 for Hall sensor 24, preferably includes scaling resistors 58 and winding 32. Resistor 82 is connected between terminal 48 of the Hall sensor 24, and input terminal 66 of the differential power amplifier 64. Furthermore, resistor 82 is connected to the amplifier 64 feedback resistor 86. Resistor 84 is connected between terminal 50 of the Hall sensor 24 and input terminal 68 of the differential power amplifier 64. In addition, resistor 84 is connected through a resistor 88 to ground. The value of resistors 82 and 84 are preferably substantially equal and substantially greater than the internal impedance of the associated Hall sensor 24, so as to provide an independent feedback path 56 whose current is unaffected by variations in the internal impedance of the sensor 24. By way of example and not limitation, if the internal impedance of the Hall sensor 24 is forty ohms then a reasonable value for each of resistors 82 and 84 is 10,000 ohms.

A similar arrangement is preferably provided for the independent feedback path 60 for sensor 26 wherein the feedback path 60 includes scaling resistor 62 and winding 34. Resistor 90 is connected between terminal 52 of the Hall sensor 26 and input terminal 74 of the differential power amplifier 72, as well as being connected to the amplifier 72 feedback resistor 94. Resistor 92 is connected between terminal 54 of the sensor 26 and input terminal 76 of the differential power amplifier 72, as well as through a resistor 96 to ground. Preferably, the internal impedance of sensor 26 and the values of resistors 90 and 92 are identical with those of sensor 24 and resistors 82 and 84, respectively, as is their relative relationship. The balance of the circuitry in this embodiment (FIG. 4) is identical with that of the embodiment shown in FIG. 2, and the operation of this embodiment (FIG. 4) is identical with that described with reference to FIG. 2, with the additional advantage that the value of the resistors 82, 84, 90 and 92 can be chosen to be a sufficiently high value so as to provide true independence from sensor internal impedance variations.

Figure 5:
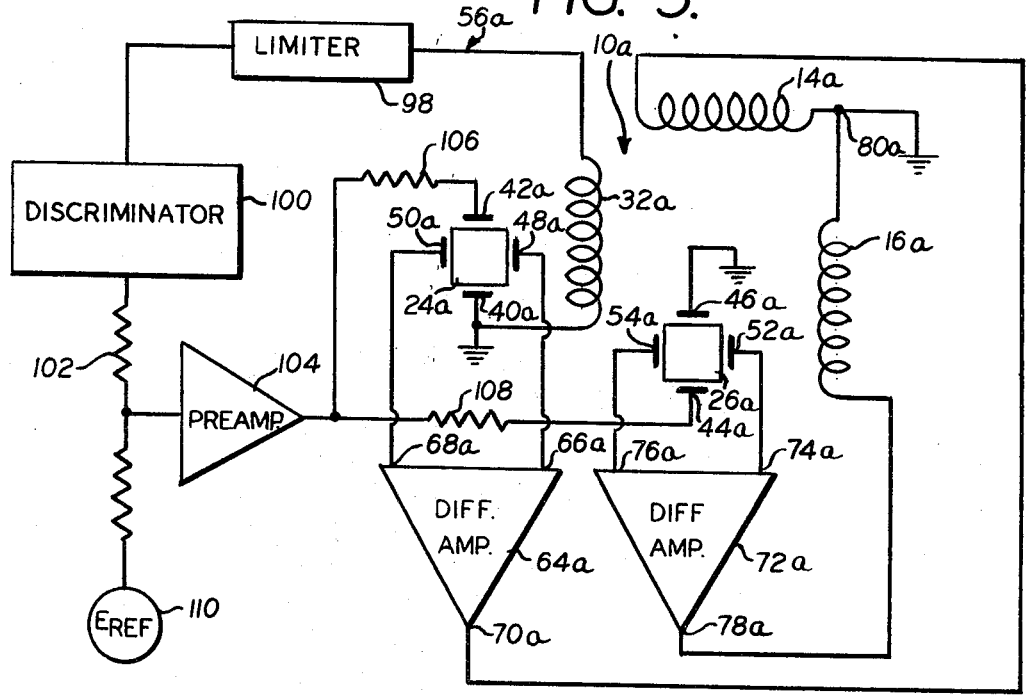

Referring now to FIG. 5, and using the same reference numeral, followed by a subscript "a", for components similar to those described with reference to FIG. 2, the feedback paths 56 and 60 for the Hall sensors 24 and 26 can be modified to provide a constant speed brushless D. C. motor, which is generally referred to by the reference numeral 10a. The rotor 18 has been omitted for purposes of clarity. In addition to the rotor 18 (not shown) the motor 10a includes a pair of stator excitation windings 14a and 16a, termed the cosine and sine windings, respectively, which are connected together at one end at a point 80a which point 80a is in turn connected to ground. As shown and preferred, a pair of Hall sensors 24a and 26a, are similar to the Hall sensors 24 and 26 described with reference to the embodiment shown in FIG. 1, and which provide output signals proportional to the magnetic field strength, are mounted 90° apart from each other and from the magnetic axis of the two excitation stator windings 14a and 16a. In the embodiment shown in FIG. 5, the independent feedback path 60 and associated independent feedback winding 34 are not included as a direct rate feedback path is not provided for sensor 26a. If desired, however, a direct rate feedback path similar to path 60 could be included for sensor 26a. Sensor 26a includes output terminals 44a, 46a, 52a, and 54a. Terminals 54a and 52a, respectively, are connected to a differential power amplifier 72a, similar to differential power amplifier 72, having input terminals 74a and 76a and an output terminal 78a, with terminal 52a being connected to input terminal 74a and terminal 54a being connected to input terminal 76a, and output terminal 78a being connected to the other end of excitation winding 16a which is not connected to point 80a.

Hall sensor 24a has output terminals 40a, 42a, 48a and 50a. Terminal 40a is connected to ground, as is terminal 46a. Independent stator feedback winding 32a is wound on a separate core from excitation windings 14a and 16a to prevent direct coupling thereto, and is associated with Hall sensor 24a. Feedback winding 32a is, preferably, angularly displaced 90° from excitation windings 14a and is aligned with the magnetic axis of the associated Hall sensor 24a. Terminal 48a of sensor 24a is connected to an input terminal 66a of a differential power amplifier 64a which is similar to differential power amplifier 64 in the embodiment shown in FIG. 2. Amplifier 64a has an input terminal 68a and an output terminal 70a in addition to input terminal 66a. Terminal 50a of the sensor 24a is connected to the other input terminal 68a of the differential power amplifier 64a whose output terminal 70a is connected to the other end of the excitation winding 14a. The winding 32a has one end connected to terminal 40a, which terminal 40a is connected to ground, and the other end connected to the input of a conventional limiting amplifier 98 of the type which produces a constant amplitude output. The output of the limiter 98 is connected to the input of a frequency sensitive circuit, which, as shown and preferred, is a conventional discriminator 100 having an associated center frequency. If desired the discriminator 100 could be replaced by another frequency sensitive circuit such as a ratio detector. The output of discriminator 100 is connected through an impedance 102 to the input of a conventional summing circuit, which, as shown and preferred, is a conventional operational pre-amplifier 104. The output of pre-amplifier 104 is connected in parallel to output terminals 44a of sensor 26a and 42a of sensor 24a, respectively. Resistors 106 and 108 are respectively connected between the pre-amplifier 104 output and terminal 42a, and the pre-amplifier 104 output and terminal 44a. These resistors 106 and 108 are scaling resistors similar to scaling resistors 58 and 62, respectively, and may be omitted if desired. A feedback path 56a for the Hall sensor 24a is, therefore, provided from terminal 40a through feedback winding 32a, limiter 98, discriminator 100, resistor 102, pre-amplifier 104, and resistor 106 to terminal 42a. The function of this feedback path 56a will be described in greater detail hereinafter. A source of reference potential 110, which is preferably a constant value reference potential, is connected in parallel with the input of pre-amplifier 104 and resistor 102 so as to provide a negative feedback path 56a to terminal 42a of the output of pre-amplifier 104.

Figure 6:
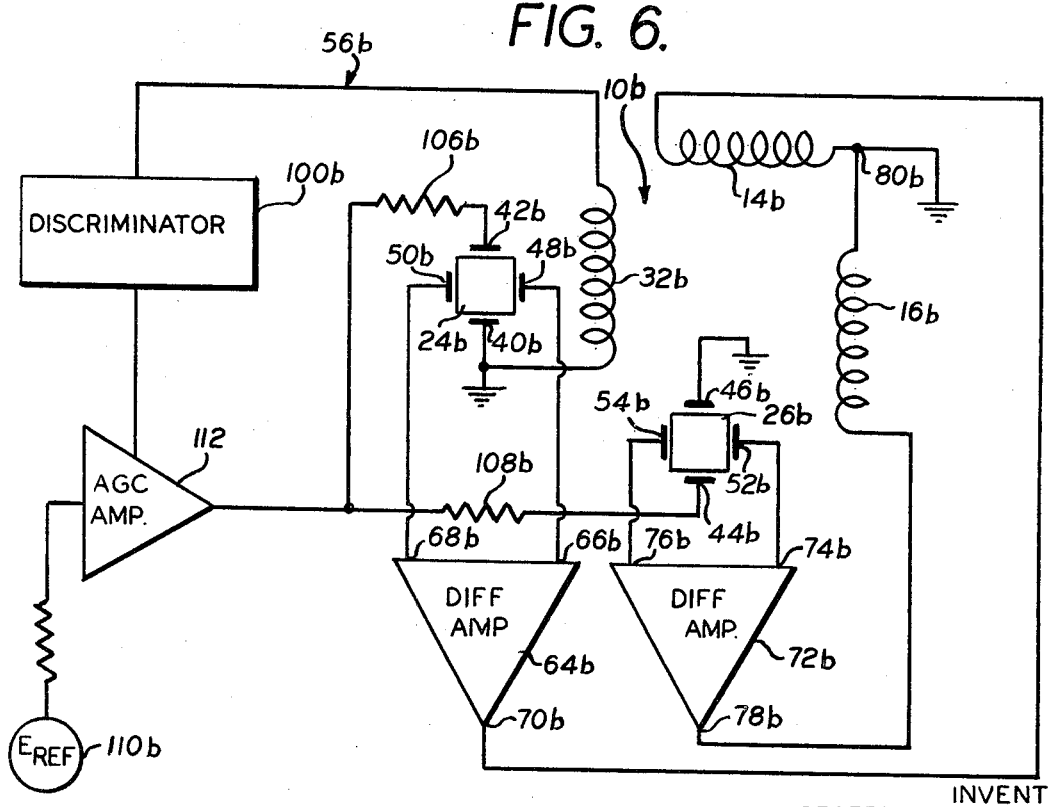
FIG. 6 is a schematic diagram of yet another alternative embodiment of the invention shown in FIG. 1.

The embodiment shown in FIG. 6 is substantially identical to the embodiment shown in FIG. 5, with similar numerals followed by the subscript "b" being utilized for identical components in FIG. 6 which occur in FIG. 5, with the modifications thereto being limited to the feedback path 56b between terminals 40b and 42b of Hall sensor 24b. A conventional frequency sensitive discriminator 100b and an automatic gain control (AGC) operational amplifier 112 are provided in the feedback path 56b in lieu of the limiter 98, discriminator 100 and pre-amplifier 104 of the embodiment shown in FIG. 5. The output of coil 32b is connected to the input of discriminator 100b and the output of discriminator 100b is, in turn, connected to the input of the automatic gain control amplifier 112. The source of reference potential 110b which is, again, preferably a constant potential source, is connected to the automatic gain control amplifier 112 input so as to control the gain for the amplifier 112. The output of amplifier 112 is connected in parallel with terminal 42b through resistor 106b, and with terminal 44b through resistor 108b. The balance of the components in the schematic of FIG. 6 are identical with the components in the schematic of FIG. 5, and need not be further described.

OPERATION — EMBODIMENTS OF FIGS. 5 AND 6

The operation of the embodiment shown in FIG. 5 is similar to that previously described with reference to the preferred embodiment shown in FIGS. 1 and 2 with the differences therefrom enumerated hereinafter. Since sensor 26a does not have an independent winding associated therewith no induced signal proportional to the rotor angular velocity is directly induced across the terminals of the Hall sensor 26a. As the rotor 18 turns as was previously mentioned, the signal is induced in winding 32a which is proportional to the angular velocity of the rotor shaft 22 of the motor 10a. The frequency of this signal, which is defined by the equation, $f = \omega/2\pi$, where $\omega$ (omega) equals the angular velocity of the motor shaft 22, is directly proportional to the rotor shaft speed and independent of temperature. If the motor 10a is connected without the feedback winding 32a directly in the circuit, the rotor shaft speed will be limited by the friction and back EMF (electromotive force) of the excitation windings 14a and 16a. With the circuit as shown in FIG. 5, the voltage induced in the winding 32a is fed into the conventional limiting amplifier 98 which produces a constant amplitude output for the voltage signal supplied from the winding 32a. This constant amplitude voltage feedback signal has a frequency which is directly proportional to the motor shaft speed and is fed into the discriminator 100. A D. C. voltage proportional to the deviation from the center frequency of the discriminator 100 is produced. This D. C. voltage signal is fed to the input of the pre-amplifier 104. The reference voltage signal from source 110 is fed in parallel with the D. C. voltage discriminator output signal to the input to the pre-amplifier 104, which, with the reference voltage being a constant, is summed to provide negative feedback to the pre-amplifier 104 which produces a speed regulation control signal to control the shaft speed independent of the load and feedback voltage variation to the Hall sensor 24a via terminal 42a. In this manner, the rotor shaft speed is determined in accordance with the center frequency of the discriminator 100 which may be adjusted for any desired constant rotor shaft speed.

In the embodiment shown in FIG. 6 the operation is similar to that previously described with reference to the embodiment shown in FIG. 5 with the following exceptions. The induced voltage signal output of coil 32b is fed into the discriminator 100b which produces a D. C. voltage proportional to the deviation from the discriminator 100b center frequency. This discriminator D. C. voltage output signal is fed to the automatic gain control amplifier 112 where a mathematical operation, such as multiplication or division of the signal, is performed electronically to provide an output signal which is a linear function of the discriminator D. C. voltage output signal. The reference potential source 110b controls the gain of the automatic gain control amplifier 112 and, hence, the gain of the system. The output of the automatic gain control amplifier 112 is fed in parallel through resistor 106b to terminal 42b of the Hall sensor 24b to complete the feedback path 56b to the sensor 24b, and through resistor 108b to terminal 44b of Hall sensor 26b. If high stability is desired a crystal filter can be utilized in the discriminator circuit 100 or 100b.

By utilizing the brushless D. C. motor of the present invention, direct rate feedback control as well as frequency sensitive constant speed control can be provided for a brushless D. C. motor which can be made reversible to provide a useful and accurate servo-mechanism.

It is to be understood that the above described embodiments of the present invention are merely illustrative thereof and that numerous modifications and embodiments of the invention may be derived within the sprit and scope thereof, such as by modifying the constant speed motor configuration to provide direct rate feedback in the manner described with reference to FIGS. 3 or 4.

What is claimed is:

1. In a reversible brushless D. C. motor having a first stator winding means, a magnetic rotor rotatably positioned in magnetic coupled relation with said first stator winding means, and a magnetic flux sensor means positioned in fixed relation to said first stator winding means and in magnetic coupled relation to said rotor for sensing the magnitude of the rotor flux density as a sinusoidal function of angular position of the rotor and producing an output signal proportional thereto; the improvement comprising a second stator having a winding electrically independent from said first stator winding means and positioned in magnetic coupled relation with said rotor; and an independent proportional feedback path for said sensor means for providing a substantially instantaneous feedback response, said independent feedback path including said second stator winding, said second stator winding being connected across said sensor means so as to provide said instantaneous feedback response thereto whereby substantially instantaneous direct rate feedback control for the sensor means is provided, said direct rate feedback control being bidirectional, the output of said sensor means being coupled to said first stator winding means.

2. A brushless D. C. motor in accordance with claim 1 wherein said sensor is capable of producing a voltage which is proportional to a sinusoidal function of the combined angular position of the rotor and the angular position of the sensor with respect to the first stator.

3. A brushless D. C. motor in accordance with claim 1 wherein said magnetic flux sensor means is a Hall effect sensor means. respectively.

4. A brushless D. C. motor in accordance with claim 1 wherein said first stator comprises first and second windings electrically angularly displaced from each other and said magnetic flux sensor means comprises first and second sensors angularly displaced with respect to each other and to said first stator first and second windings, respectively.

5. A brushless D. C. motor in accordance with claim 4 wherein said second stator further comprises a second stator winding; each sensor has an associated independent feedback path for said sensor, said first sensor first feedback path including said second stator first winding and said second sensor feedback path including said second stator second winding.

6. A brushless D. C. motor in accordance with claim 5 wherein said first stator windings are electrically angularly displaced 90° from each other; said sensors are positioned 90° with respect to each other and 90° with respect to the respective first stator windings, and said second stator windings, respectively, each have the magnetic axis thereof aligned with the respective associated sensor.

7. A brushless D. C. motor in accordance with claim 5 wherein said first stator windings are electrically angularly displaced 90° from each other; and said sensors are positioned 90° with respect to each other and 45° with respect to the respective first stator windings, respectively, each first stator winding having the magnetic axis thereof aligned with the respective associated sensor.

8. A brushless D. C. motor in accordance with claim 5 wherein the first and second sensors, respectively, are capable of producing a voltage which is proportional to a sinusoidal function of the combined angular position of the rotor and the angular position of the sensor with respect to its respective first stator winding.

9. A brushless D. C. motor in accordance with claim 8 wherein said first sensor produces a voltage proportional to $\sin(\theta + \beta)$ and said second sensor produces a voltage proportional to $\cos(\theta + \beta)$, where $\theta$ is the angular position of the rotor, and $\beta$ is the angular position of the sensor with respect to its associated respective first stator winding.

10. A brushless D. C. motor in accordance with claim 1 wherein said independent feedback path further includes speed torque curve slope control means.

11. A brushless D. C. motor in accordance with claim 1 further comprising a signal path between the sensor means and the first stator, said first stator signal path being connected in parallel with said independent feedback path, and a differential amplifier means in said first stator signal path.

12. A brushless D. C. motor in accordance with claim 11 wherein said independent feedback path further includes an impedance, said sensor means having an internal impedance associated therewith, said impedance in said feedback path being substantially greater than said sensor internal impedance whereby sensor voltage variations due to sensor internal impedance variations are minimized.

13. A brushless D. C. motor in accordance with claim 11 wherein said first stator comprises first and second windings electrically angularly displaced from each other and said magnetic flux sensor means comprises first and second sensors angularly displaced with respect to each other and to said first stator first and second windings, respectively.

14. A brushless D. C. motor in accordance with claim 13 wherein said second stator further comprises a second stator winding; each sensor has an associated independent feedback path for said sensor, said first sensor feedback path including said second stator first winding and said second sensor feedback path including said second stator second winding.

15. A brushless D. C. motor in accordance with claim 14 wherein each sensor has an associated separate signal path between the sensor and the respective first stator winding, and said differential amplifier means comprises first and second differential amplifiers, said first differential amplifier being in said first stator first winding signal path and said second differential amplifier being in said first stator second winding signal path.

16. A brushless D. C. motor in accordance with claim 1 wherein said rotor has an angular velocity associated therewith, said rotor angular velocity having a frequency corresponding thereto, said proportional signal being at said corresponding frequency; and said independent feedback path further includes means responsive to said rotor angular velocity corresponding frequency, said responsive means having a center frequency associated therewith, for producing a feedback signal proportional to a deviation of said corresponding frequency from said center frequency.

17. A brushless D. C. motor in accordance with claim 16 wherein said independent feedback path further includes means responsive to said feedback signal for functionally operating on said feedback signal to produce a speed regulation signal, said speed regulation signal being supplied to said sensor means.

18. A brushless D. C. motor in accordance with claim 17 wherein said functionally operating means includes means for functionally combining said feedback signal with a reference signal to produce said speed regulation signal.

19. A brushless D. C. motor in accordance with claim 16 wherein said feedback path includes means responsive to said proportional signal for limiting said signal to provide a constant amplitude signal thereof at said corresponding frequency, said frequency responsive means being responsive to said constant amplitude signal corresponding frequency to produce said feedback signal.

20. A brushless D. C. motor in accordance with claim 18 wherein said functional combining means includes means for summing said reference signal and said feedback signal to produce said speed regulation signal.

21. A brushless D. C. motor in accordance with claim 20 wherein said reference signal is a constant and said feedback signal is a negative feedback signal.

22. A brushless D. C. motor in accordance with claim 17 wherein said functional operating means includes means for producing said speed regulation signal as a linear function of said feedback signal.

23. A brushless D. C. motor in accordance with claim 22 wherein said linear function means is an automatic gain control amplifier means having an input and an output and a means for controlling the gain of the amplifier means, said input being said feedback signal, said output being said linear function speed regulation signal.

24. A brushless D. C. motor in accordance with claim 23 wherein said amplifier gain control means provides a reference signal to said amplifier means, said reference signal being a constant, said feedback signal being a negative feedback signal.

25. A brushless D. C. motor in accordance with claim 17 wherein said first stator comprises first and second windings electrically angularly displaced from each other and said magnetic flux sensor means comprises first and second sensors angularly displaced with respect to each other and to said first stator first and second windings, respectively.

26. A brushless D. C. motor in accordance with claim 25 wherein said independent feedback path includes said first sensor and said speed regulation signal is supplied to both said first and second sensors.

27. A brushless D. C. motor in accordance with claim 25 further comprising first and second differential amplifier means each sensor having an associated separate signal path between the sensor and the respective first stator winding, said first differential amplifier means being in said first stator first winding signal path and said second differential amplifier means being in said first stator second winding signal path.

28. A brushless D. C. motor in accordance with claim 17 further comprising a signal path between the sensor means and the first stator, and a differential amplifier means in said first stator signal path.

* * * * *